(12) United States Patent
Keum et al.

(10) Patent No.: US 12,218,936 B2
(45) Date of Patent: Feb. 4, 2025

(54) DEVICE AND METHOD FOR ACCESSING SERVICE USING AUTHENTICATION OF ELECTRONIC DEVICE

(71) Applicant: Samsung Electronics Co., Ltd., Suwon-si (KR)

(72) Inventors: Jieun Keum, Suwon-si (KR); Oleksandr Andrieiev, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 604 days.

(21) Appl. No.: 17/598,600

(22) PCT Filed: Mar. 18, 2020

(86) PCT No.: PCT/KR2020/003716
§ 371 (c)(1),
(2) Date: Sep. 27, 2021

(87) PCT Pub. No.: WO2020/197160
PCT Pub. Date: Oct. 1, 2020

(65) Prior Publication Data
US 2022/0158998 A1    May 19, 2022

(30) Foreign Application Priority Data
Mar. 27, 2019  (KR) .................. 10-2019-0035181

(51) Int. Cl.
*H04L 9/40*    (2022.01)
*H04L 9/32*    (2006.01)
(52) U.S. Cl.
CPC ........ *H04L 63/0876* (2013.01); *H04L 9/3226* (2013.01); *H04L 63/0823* (2013.01)

(58) Field of Classification Search
CPC .................. H04L 63/0876; H04L 63/0823; H04L 9/3226
See application file for complete search history.

(56) References Cited

U.S. PATENT DOCUMENTS 9,386,445 B2   7/2016  Koo et al.
10,936,261 B2  3/2021  Park et al.
(Continued)

FOREIGN PATENT DOCUMENTS

CN     106603461 A     4/2017
JP     2015-108868 A   6/2015
(Continued)

OTHER PUBLICATIONS

Korean Notice of Allowance dated Jan. 30, 2024, issued in Korean Application No. 10-2019-0035181.
(Continued)

*Primary Examiner* — Chau Le
(74) *Attorney, Agent, or Firm* — Jefferson IP Law, LLP

(57) ABSTRACT

Provided is a method of accessing a service by using authentication of an electronic device. An operation method of the electronic device includes: selecting a cloud server for storing data, based on first authentication information including an identifier of the electronic device and network addresses of a plurality of cloud servers; transmitting, to a service providing server, second authentication information including the identifier of the electronic device, a network address of the selected cloud server, and information about a service executed on the electronic device; and receiving, from the service providing server, information about a result of subscribing to the service determined based on the second authentication information.

10 Claims, 9 Drawing Sheets

(56) References Cited

U.S. PATENT DOCUMENTS

| | | | |
|---|---|---|---|
| 2009/0205037 A1* | 8/2009 | Asakura | G06F 21/629 |
| | | | 707/999.009 |
| 2010/0031329 A1* | 2/2010 | Kim | H04W 12/069 |
| | | | 726/5 |
| 2017/0127276 A1* | 5/2017 | Koo | H04L 63/0807 |
| 2017/0327084 A1* | 11/2017 | Park | B60R 16/037 |
| 2018/0359201 A1 | 12/2018 | Rangasamy et al. | |
| 2018/0359279 A1 | 12/2018 | Knight | |
| 2019/0116179 A1* | 4/2019 | Xu | H04L 9/3226 |
| 2019/0340650 A1 | 11/2019 | Dewitt et al. | |
| 2020/0195633 A1* | 6/2020 | Sham | H04W 12/069 |

FOREIGN PATENT DOCUMENTS

| | | |
|---|---|---|
| KR | 10-2014-0080958 A | 7/2014 |
| KR | 10-2014-0081041 A | 7/2014 |
| KR | 10-2016-0000251 A | 1/2016 |
| KR | 10-2017-0126781 A | 11/2017 |
| KR | 10-2019-0007959 A | 1/2019 |
| KR | 10-1937197 B1 | 1/2019 |

OTHER PUBLICATIONS

International Search Report with Written Opinion and English translation dated Jul. 6, 2020; International Appln. No. PCT/KR2020/003716.

* cited by examiner

DEVICE AND METHOD FOR ACCESSING SERVICE USING AUTHENTICATION OF ELECTRONIC DEVICE

TECHNICAL FIELD

The disclosure generally relates to an apparatus and method for accessing a service by using authentication of an electronic device.

BACKGROUND ART

According to the use of a service authentication method based on an identifier (ID) and password of a user, user information, such as the ID and password of the user, is often input to a device. Also, different IDs and passwords are used for each service used by the user, and different applications need to be installed for each service. In this regard, there is a need for a method of accessing a plurality of services by using a single authentication.

DESCRIPTION OF EMBODIMENTS

Solution to Problem

The disclosure may provide an apparatus and method for accessing a service by using authentication of an electronic device.

Also, an embodiment of the disclosure may provide an apparatus and method for subscribing to and accessing a service, based on an identifier (ID) of an electronic device.

In addition, an embodiment of the disclosure may provide an apparatus and method for transmitting data stored in a cloud server to a service providing server, based on an ID of an electronic device.

BEST MODE

Figure 1:
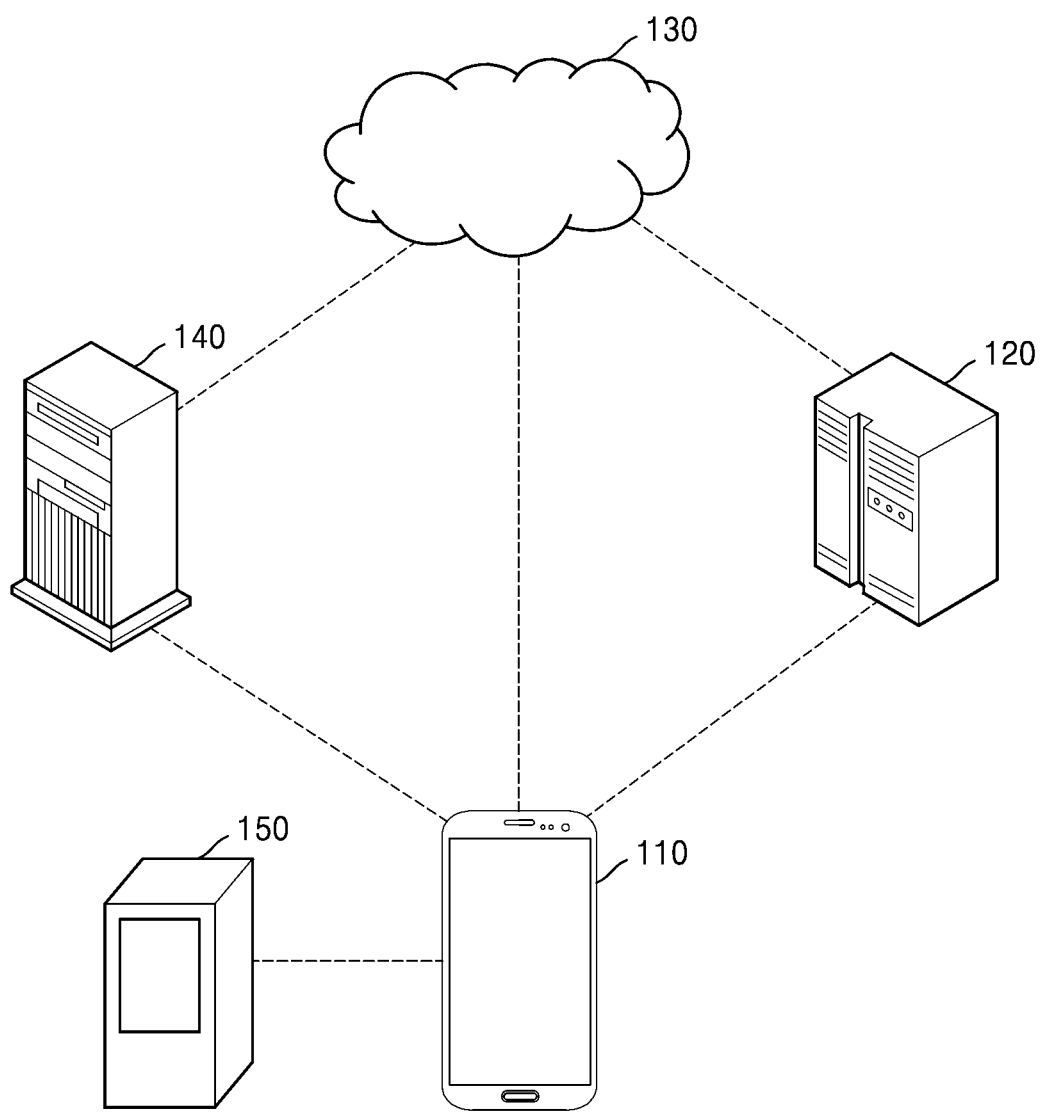
FIG. 1 is a system diagram showing an operation environment of entities, according to an embodiment of the disclosure.

According to an embodiment of the disclosure, an operation method of an electronic device includes: selecting a cloud server for storing data, based on first authentication information including an identifier of the electronic device and network addresses of a plurality of cloud servers; transmitting, to a service providing server, second authentication information including the identifier of the electronic device, a network address of the selected cloud server, and information about a service executed on the electronic device; and receiving, from the service providing server, information about a result of subscribing to the service determined based on the second authentication information.

According to an embodiment of the disclosure, an operation method of a cloud server includes: receiving, from a service providing server, an identifier of an electronic device; verifying a root certificate of a manufacturer server of the electronic device, based on the received identifier of the electronic device; and transmitting data stored in the cloud server to the service providing server, based on the verifying of the root certificate.

According to an embodiment of the disclosure, an electronic device includes: a transceiver; a memory; and at least one processor configured to: select a cloud server for storing data, based on first authentication information including an identifier of the electronic device and network addresses of a plurality of cloud servers; transmit, to a service providing server, second authentication information including the identifier of the electronic device, a network address of the selected cloud server, and information about a service executed on the electronic device; and receive, from the service providing server, information about a result of subscribing to the service determined based on the second authentication information.

According to an embodiment of the disclosure, a cloud server includes: a transceiver, a memory, and at least one processor configured to: receive, from a service providing server, an identifier of an electronic device; verify a root certificate of a manufacturer server of the electronic device, based on the received identifier of the electronic device; and transmit data stored in the cloud server to the service providing server, based on the verifying of the root certificate.

MODE OF DISCLOSURE

Hereinafter, embodiments of the disclosure will be described in detail with reference to the accompanying drawings such that one of ordinary skill in the art may easily implement the disclosure. However, the disclosure may be implemented in various different forms and is not limited to the embodiments described herein. Also, in the drawings, parts irrelevant to the description are omitted in order to clearly describe the disclosure, and like reference numerals designate like elements throughout the specification.

Terms used in the disclosure are described as general terms currently used in consideration of functions described in the disclosure, but the terms may have different meanings according to an intention of one of ordinary skill in the art, precedent cases, or the appearance of new technologies. Thus, the terms used herein should not be interpreted only by its name, but have to be defined based on the meaning of the terms together with the description throughout the specification.

While such terms as "first", "second", etc., may be used to describe various components, such components must not be limited to the above terms. The above terms are used only to distinguish one component from another.

Throughout the specification, when a part is "connected" to another part, the part may not only be "directly connected" to the other part, but may also be "electrically connected" to the other part with another element in between. In addition, when a part "includes" a certain element, the part may further include another element instead of excluding the other element, unless otherwise stated.

The phrases "an embodiment" or the like appearing in various places in the disclosure are not necessarily all referring to the same embodiment.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the disclosure may employ general techniques for electronic environment setting, signal processing, and/or data processing. Terms such as "mechanism", "element", "means", and "configuration" may be used widely and are not limited as mechanical and physical configurations.

In addition, a connection line or a connection member between components shown in drawings is merely a functional connection and/or a physical or circuit connection. In an actual device, connections between components may be represented by various functional connections, physical connections, or circuit connections that are replaceable or added.

Hereinafter, the disclosure will be described in detail with reference to accompanying drawings.

A security issue may occur in an existing service authentication method based on an identifier (ID) and password of a user. For example, in an existing authentication method, an ID and password of a user need to be input on a device whenever the user is to use a service, and thus there is a risk that information about the ID and password of the user may be stolen by a third person. Also, to use a plurality of services, different applications need to be installed for each service, and thus it may be inconvenient for the user to use a service. In addition, an ID and password are present for each of a plurality of services, and thus the user may have difficulty in managing the ID and password.

An embodiment of the disclosure may provide an apparatus and method for accessing a service by using authentication of an electronic device. For example, a user may subscribe to a service by using an ID of an electronic device and use the service. Also, the user may subscribe to a plurality of services by using an embedded application of a single device and use the services. An external device, such as a service reader device, may recognize an electronic device, such as a smartphone, possessed by the user, such that information of the user may be transmitted from a cloud server to a service providing server. The service providing server may use the received information of the user and allow the user to subscribe to a new service. According to an embodiment, accessing a service may denote subscribing to the service to be used by the user, denote using the service by the user, and denote providing the service to the electronic device of the user.

FIG. 1 is a system diagram showing an operation environment of entities, according to an embodiment of the disclosure.

According to an embodiment, the entities may denote independent or non-independent entities that perform operations according to the disclosure. For example, in FIG. 1, the entities may include an electronic device 110, a manufacturer server 120, a cloud server 130, a service providing server 140, and a reader device 150. However, the disclosure is not limited thereto.

Referring to FIG. 1, the electronic device 110 may be a smartphone, a tablet personal computer (PC), a mobile phone, a personal digital assistant (PDA), a laptop computer, a media player, a micro server, a global positioning system (GPS) device, an electronic book terminal, a digital broadcasting terminal, a navigation device, an MP3 player, a digital camera, a home appliance, and another mobile or non-mobile computing device, but is not limited thereto. A user may access a service to be used, by using the electronic device 110.

The manufacturer server 120 may denote a server of a manufacturer of the electronic device 110. During a manufacturing process of the electronic device 110, the manufacturer server 120 may pre-store, in the electronic device 110, authentication information, such as an ID of the electronic device 110.

The cloud server 130 may denote a server where data about the user of the electronic device 110 may be stored. According to an embodiment, the cloud server 130 may denote a server managed by the manufacturer of the electronic device 110 or an external server not managed by the manufacturer of the electronic device 110.

The service providing server 140 may denote a server providing a service to the electronic device 110. For example, the service providing server 140 may denote a management server of an accommodation, such as a hotel, a resort, or a condominium. Also, the service providing server 140 may denote a management server managing rental of transportation, such as a vehicle, a bicycle, a kick board, an electric bicycle, or an electric kick board.

The reader device 150 may denote a device related to a service to be used by the user of the electronic device 110. For example, the reader device 150 may denote a reader that is attached to a door of a room of an accommodation to detect the electronic device 110 or communicate with the electronic device 110, or a kiosk provided outside the room. Also, the reader device 150 may denote a kiosk provided at a place where the transportation may be rented, or a reader attached to the transportation to detect to the electronic device 110 or communicate with the electronic device 110.

According to an embodiment, the manufacturer server 120 may generate first authentication information while manufacturing the electronic device 110, and store the first authentication information in the electronic device 110. According to an embodiment, the first authentication information may include an ID of the electronic device 110 or network addresses of a plurality of cloud servers.

According to an embodiment, a network address of a cloud server may denote a uniform resource identifier (URI) or uniform resource locator (URL) for accessing the cloud server. Also, the network address of the cloud server may denote a destination from which the service providing server 140 requests data of the user. A network address of the cloud server 130 may include information about a contract relationship between the cloud server 130 and manufacturer server 120. According to an embodiment, the first authentication information may include a root certificate. For example, the root certificate may denote a public key certificate managed by a root certificate authority (CA), or a self-signed certificate. For example, the root CA may be the manufacturer server 120.

According to an embodiment, the electronic device 110 may store, in a secure zone of the electronic device 110, the first authentication information generated by the manufacturer server 120. The electronic device 110 may select the cloud server 130 for storing data, based on the network addresses of the plurality of cloud servers included in the first authentication information. According to an embodiment, an operation of the electronic device 110 selecting the cloud server 130 may be performed during a bootstrap process in which the electronic device 110 is turned on.

According to an embodiment, to use the service, the user of the electronic device 110 may take the electronic device 110 near the reader device 150 related to the service. When the electronic device 110 is present within a threshold distance from the reader device 150, the electronic device 110 may detect the reader device 150. For example, the electronic device 110 may detect a signal output from the reader device 150. According to an embodiment, the threshold distance for the electronic device 110 to detect the reader device 150 may be measured via various methods, and in the disclosure, a distance from a reader device to an electronic device may be derived by using ultra wide-band physical layer and MAC layer technology. Alternatively, strength of a signal output from the reader device 150 may denote a distance equal to or greater than a threshold value. Here, information about the threshold value may be pre-stored in the electronic device 110 or reader device 150, and a unit of the threshold value may be dBm.

When the reader device 150 is detected, the electronic device 110 may transmit information about the ID of the electronic device 110 to the reader device 150. According to an embodiment, the reader device 150 may first detect the electronic device 110. For example, the reader device 150 may receive a signal output from the electronic device 110 present within the threshold distance from the reader device 150, and detect the electronic device 110. When the reader device 150 first detects the electronic device 110, the reader device 150 may transmit, to the electronic device 110, information indicating that the electronic device 110 is detected.

According to an embodiment, when the electronic device 110 is present within the threshold distance from the reader device 150, a popup window inquiring whether the user is to use the service may be displayed on a display of the electronic device 110. For example, the popup window may include a first button (e.g., yes) indicating that the user is to use the service, and a second button (e.g., no) indicating that the user is not to use the service. The user may determine whether to use the service, by clicking or touching the first button or second button of the displayed popup window. According to an embodiment, the electronic device 110 and the reader device 150 may transmit and receive signals or messages with each other via short-range communication. For example, the short-range communication may denote Bluetooth, Bluetooth low energy (BLE), near field communication, wireless local area network (WLAN), Wi-Fi, Zigbee, infrared data association (IrDA) communication, Wi-Fi direction (WFD) communication, or ultra wideband (UWB) communication.

According to an embodiment, when the user selects to use the service, the reader device 150 may transmit, to the electronic device 110, network address information of the service providing server 140. The electronic device 110 may transmit second authentication information to the service providing server 140, based on the received network address information of the service providing server 140. According to an embodiment, the second authentication information may include the ID of the electronic device 110, the network address of the cloud server 130, and information about the service executed by the electronic device 110. Hereinabove, it has been described that the reader device 150 transmits the network address information of the service providing server 140 to the electronic device 110 when the user selects to use the service, but an embodiment is not limited thereto. For example, the reader device 150 may transmit the network address information of the service providing server 140 to the electronic device 110, based on a pre-set condition, even when the user does not select to use the service. According to an embodiment, the pre-set condition may denote a case where the electronic device 110 is pre-registered as a device capable of using the service. When the electronic device 110 is pre-registered as the device capable of using the service, the reader device 150 may transmit, to the electronic device 110, the network address information of the service providing server 140, regardless of whether the user has selected to use the service. According to an embodiment, the network address of the service providing server 140 may denote a URI address or URL address for the electronic device 110 to access the service providing server 140.

According to an embodiment, the service providing server 140 may request the cloud server 130 for user data. For example, the service providing server 140 may receive the second authentication information from the electronic device 110, and transmit, to the cloud server 130, a signal or message requesting data related to the user of the electronic device 110. According to an embodiment, the signal or message requesting data related to the user, which is transmitted by the service providing server 140 to the cloud server 130, may include the second authentication information including the ID of the electronic device 110.

According to an embodiment, the cloud server 130 may receive, from the service providing server 140, the signal or message requesting the data related to the user. The cloud server 130 may verify the root certificate of the manufacturer server 120, based on the received ID of the electronic device 110. For example, the cloud server 130 may verify whether the received ID of the electronic device 110 is authenticated by the manufacturer server 120. According to an embodiment, the cloud server 130 may directly verify whether the received ID of the electronic device 110 is authenticated by the manufacturer server 120. According to an embodiment, the cloud server 130 may indirectly verify whether the received ID of the electronic device 110 is authenticated by the manufacturer server 120. For example, the cloud server 130 may transmit, to the manufacturer server 120, a signal or message requesting verification, so as to verify whether the received ID of the electronic device 110 is authenticated by the manufacturer server 120.

When the received ID of the electronic device 110 is an ID authenticated by the manufacturer server 120, the cloud server 130 may transmit, to the service providing server 140, the data related to the user. For example, the data related to the user may include payment information of the user, user name information, or information about a user account. According to an embodiment, when the received ID of the electronic device 110 is not an ID authenticated by the manufacturer server 120, the cloud server 130 may not transmit, to the service providing server 140, the data related to the user.

According to an embodiment, the service providing server 140 may receive, from the cloud server 130, the data related to the user. After receiving the data related to the user, the service providing server 140 may transmit, to the electronic device 110, information about a result of subscribing to the service. The electronic device 110 may receive the information about the result of subscribing to the service from the service providing server 140, and use the subscribed service. For example, the electronic device 110 may unlock a shared bicycle. Also, the electronic device 110 may unlock a door of a room of an accommodation, such as a hotel. The user may use the shared bicycle or room that is unlocked by using the electronic device 110.

As described in FIG. 1, an embodiment of the disclosure may provide a device authentication-based service, instead of a user authentication-based service. Also, an interaction between the user and the electronic device 110 for subscribing to the service may be reduced. In addition, because user information, such as an ID and password, is not required to be input frequently, a risk of a third person stealing the ID and password may be reduced. Also, security of the user information may be increased because a device ID stored in the secure zone of the electronic device 110 is used. Detailed operation methods of entities of the disclosure will be described with reference to FIGS. 2 through 5.

Figure 2:
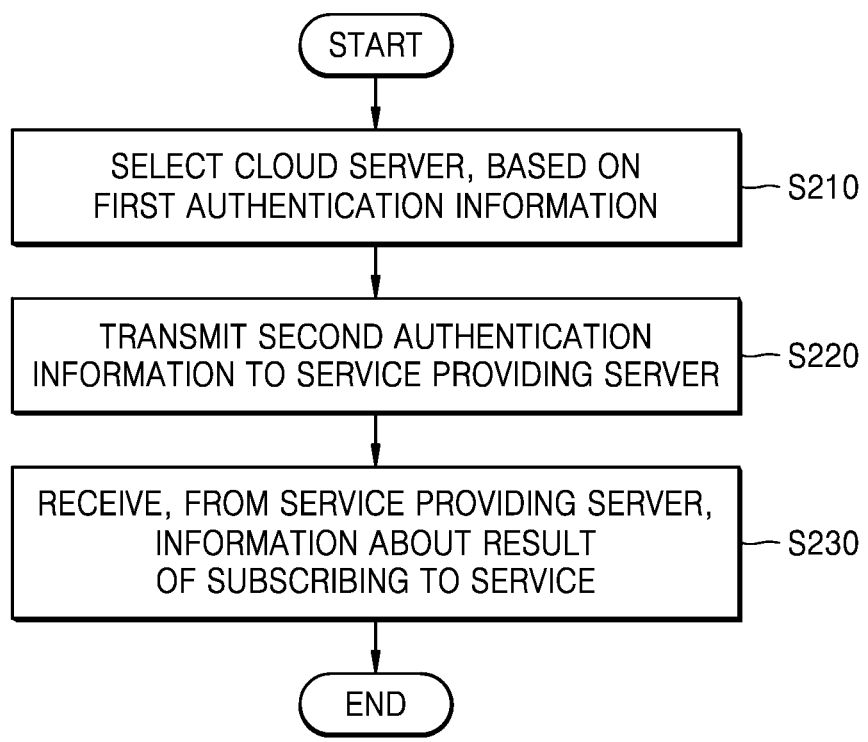
FIG. 2 is a flowchart of an operation method of an electronic device, according to an embodiment of the disclosure.

FIG. 2 is a flowchart of an operation method of an electronic device, according to an embodiment of the disclosure.

Referring to FIG. 2, the electronic device 110 may select the cloud server 130, based on the first authentication information, in operation S210. According to an embodiment, the first authentication information may include the root certificate, the ID of the electronic device 110, or the network addresses of the plurality of cloud servers 130. According to an embodiment, the first authentication information may be pre-generated by the manufacturer server 120 of the electronic device 110, or pre-stored in the electronic device 110. According to an embodiment, the electronic device 110 may select the cloud server 130 for storing data of the user, from among the network addresses of the plurality of cloud servers 130. When selecting the cloud server 130, the electronic device 110 may select the cloud server 130, based on the pre-set contract relationship between the cloud server 130 and manufacturer server 120. According to an embodiment, the ID of the electronic device 110 may be used to access, by the service providing server 140, the data of the user stored in the cloud server 130.

In operation S220, the electronic device 110 may transmit the second authentication information to the service providing server 140. According to an embodiment, the second authentication information may include the ID of the electronic device 110, the network address of the selected cloud server 130, or the information about service executed by the electronic device 110. According to an embodiment, the information about the service executed by the electronic device 110 may include the network address information of the service providing server 140 received from the reader device 150, information related to the use of the service by the user, or a service ID for identifying the service. The electronic device 110 may transmit the second authentication information including the ID of the electronic device 110 or the like to the service providing server 140, based on the network address information of the service providing server 140 received from the reader device 150.

Figure 3:
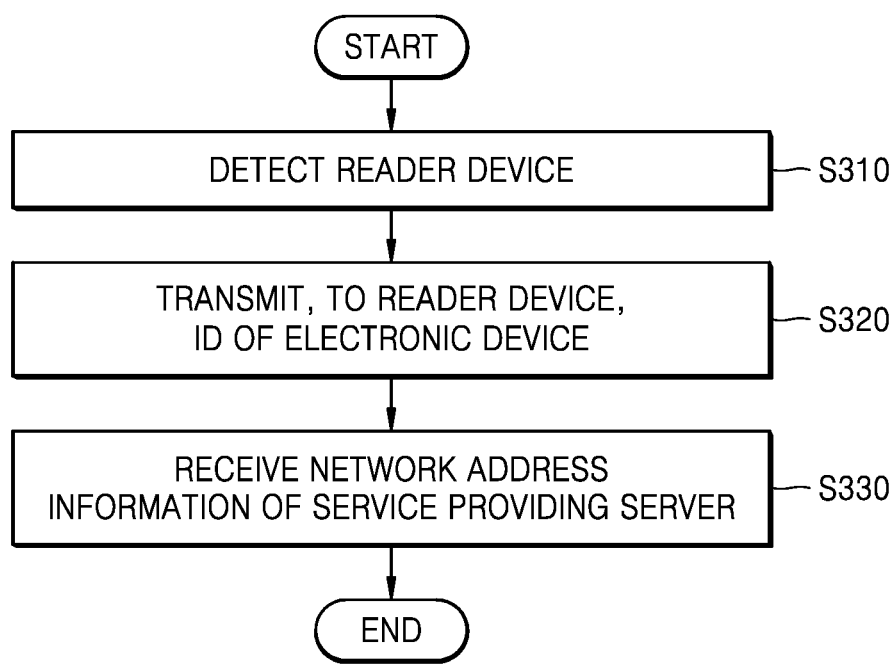
FIG. 3 is a flowchart of an operation method of an electronic device interacting with a reader device, according to an embodiment of the disclosure.

In operation S230, the electronic device 110 may receive, from the service providing server 140, information about the result of subscribing to the service. According to an embodiment, the service providing server 140 may transmit, to the cloud server 130, the signal or message requesting the data of the user, based on the second authentication information received from the electronic device 110. The cloud server 130 may verify the root certificate of the manufacturer server 120, based on the ID of the electronic device 110, which is included in the signal or message requesting the data of the user. The cloud server 130 may transmit, to the service providing server 140, the data of the user, which is stored in the cloud server 130, based on the verification of the root certificate. The electronic device 110 may receive, from the service providing server 140, the information about the result of subscribing to the service. For example, the information about the result of subscribing to the service may include information about whether the user of the electronic device 110 has subscribed to the service or information about the use the service of the electronic device 110. As shown in FIG. 2, the electronic device 110 may use the service by transmitting the ID of the electronic device 110 and being authenticated by the service providing server 140 or cloud server 130. FIG. 3 described below is for describing an operation method of the electronic device 110 performing short-range communication with the reader device 150 related to the service to be used by the user of the electronic device 110.

FIG. 3 is a flowchart of an operation method of an electronic device interacting with a reader device, according to an embodiment of the disclosure.

Referring to FIG. 3, the electronic device 110 may detect the reader device 150 in operation S310. According to an embodiment, the reader device 150 may denote a reader device related to the service executable by the electronic device 110. When the reader device 150 is present within the threshold distance from the electronic device 110, the electronic device 110 may detect the reader device 150. Although not shown in FIG. 3, according to an embodiment, the reader device 150 may first detect the electronic device 110. For example, the reader device 150 may receive the signal output from the electronic device 110 present within the threshold distance from the reader device 150, and detect the electronic device 110. According to an embodiment, when the reader device 150 is detected, the popup window inquiring whether the user is to use the service may be displayed on the display of the electronic device 110.

In operation S320, the electronic device 110 may transmit, to the reader device 150, the ID of the electronic device 110. For example, the electronic device 110 may transmit the ID of the electronic device 110 to the reader device 150, for service authentication using the electronic device 110, instead of the ID or password of the user. According to an embodiment, a communication technique using UWB may be used during communication between the electronic device 110 and reader device 150.

Figure 4:
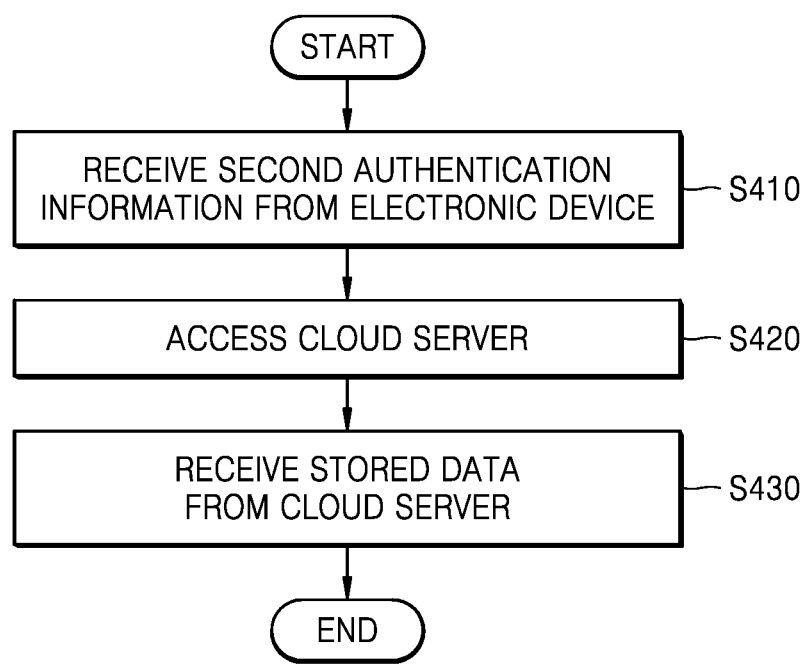
FIG. 4 is a flowchart of an operation method of a service providing server, according to an embodiment of the disclosure.

In operation S330, the electronic device 110 may receive, from the service providing server 140, the network address information. According to an embodiment, the network address information of the service providing server 140 may denote a URI address or URL address for the electronic device 110 to access the service providing server 140. The electronic device 110 may transmit the second authentication information to the service providing server 140, based on the received network address information of the service providing server 140. For example, the second authentication information may include the ID of the electronic device 110, the network address of the cloud server 130, and the information about the service executed by the electronic device 110. As shown in FIG. 3, the electronic device 110 may communicate with the reader device 150 to obtain information related to the service providing server 140 and transmit the authentication information of the electronic device 110 to the service providing server 140. FIG. 4 described below is for describing an operation method of the service providing server 140 that received the authentication information from the electronic device 110.

FIG. 4 is a flowchart of an operation method of a service providing server, according to an embodiment of the disclosure.

Referring to FIG. 4, the service providing server 140 may receive the second authentication information from the electronic device 110, in operation S410. For example, the service providing server 140 may receive, from the electronic device 110 tagged to the reader device 150 related to the server, the second authentication information including the ID of the electronic device 110, the network address of the cloud server 130, and the information about the service executed by the electronic device 110. According to an embodiment, the information about the service executed by the electronic device 110 may include the network address information of the service providing server 140 received from the reader device 150, the information related to the use of the service by the user, or the service ID for identifying the service.

In operation S420, the service providing server 140 may access the cloud server 130. In other words, the service providing server 140 may transmit, to the cloud server 130, the signal or message requesting the data of the user. According to an embodiment, the signal or message requesting the data related to the user, which is transmitted by the service providing server 140 to the cloud server 130, may include the second authentication information received by the service providing server 140 from the electronic device 110. For example, the signal or data requesting the data related to the user may include the information about the ID of the electronic device 110.

Figure 5:
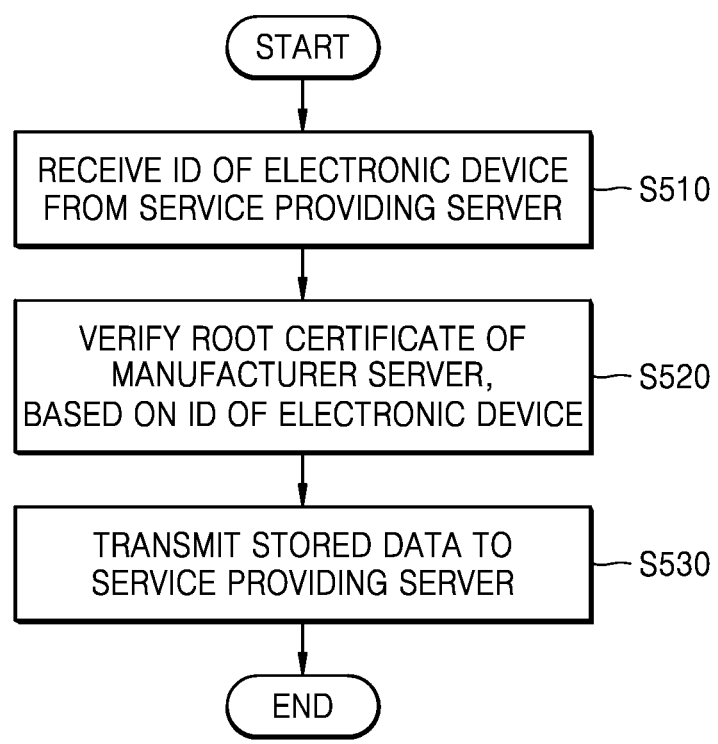
FIG. 5 is a flowchart of an operation method of a cloud server, according to an embodiment of the disclosure.

In operation S430, the service providing server 140 may receive the stored data from the cloud server 130. According to an embodiment, the cloud server 130 may receive, from the service providing server 140, the signal or message requesting the data related to the user. The cloud server 130 may verify the root certificate of the manufacturer server 120, based on the received ID of the electronic device 110, thereby authenticating the electronic device 110. When the electronic device 110 is authenticated, the cloud server 130 may transmit, to the service providing server 140, the data related to the user, which is stored in the cloud server 130. The service providing server 140 may receive, from the cloud server 130, the data related to the user. Then, the service providing server 140 may transmit, to the electronic device 110, the information about the result of subscribing to the service of the electronic device 110. As shown in FIG. 4, the service providing server 140 may request the cloud server 130 for the data related to the user, by using the ID of the electronic device 110 received from the electronic device 110. FIG. 5 described below illustrates an operation method of the cloud server 130 selected by the electronic device 110.

FIG. 5 is a flowchart of an operation method of a cloud server, according to an embodiment of the disclosure.

Referring to FIG. 5, the cloud server 130 may receive the ID of the electronic device 110 from the service providing server 140, in operation S510. For example, the cloud server 130 may receive, from the service providing server 140, the signal or message requesting the data related to the user. Here, the signal or message requesting the data related to the user may include the second authentication information received by the service providing server 140 from the electronic device 110. For example, the signal or data requesting the data related to the user may include the information about the ID of the electronic device 110.

In operation S520, the cloud server 130 may verify the root certificate of the manufacturer server 120, based on the ID of the electronic device 110. For example, the cloud server 130 may verify whether the received ID of the electronic device 110 is authenticated by the manufacturer server 120. According to an embodiment, the cloud server 130 may directly verify whether the received ID of the electronic device 110 is authenticated by the manufacturer server 120. According to an embodiment, the cloud server 130 may indirectly verify whether the received ID of the electronic device 110 is authenticated by the manufacturer server 120. For example, the cloud server 130 may transmit, to the manufacturer server 120, the signal or message requesting verification, so as to verify whether the received ID of the electronic device 110 is authenticated by the manufacturer server 120. According to an embodiment, the manufacturer server 120 may be designated as a root CA before the electronic device 110 is manufactured. Information related to the assignment of the manufacturer server 120 as the root CA may be shared between the cloud server 130 and the manufacturer server 120.

Figure 6:
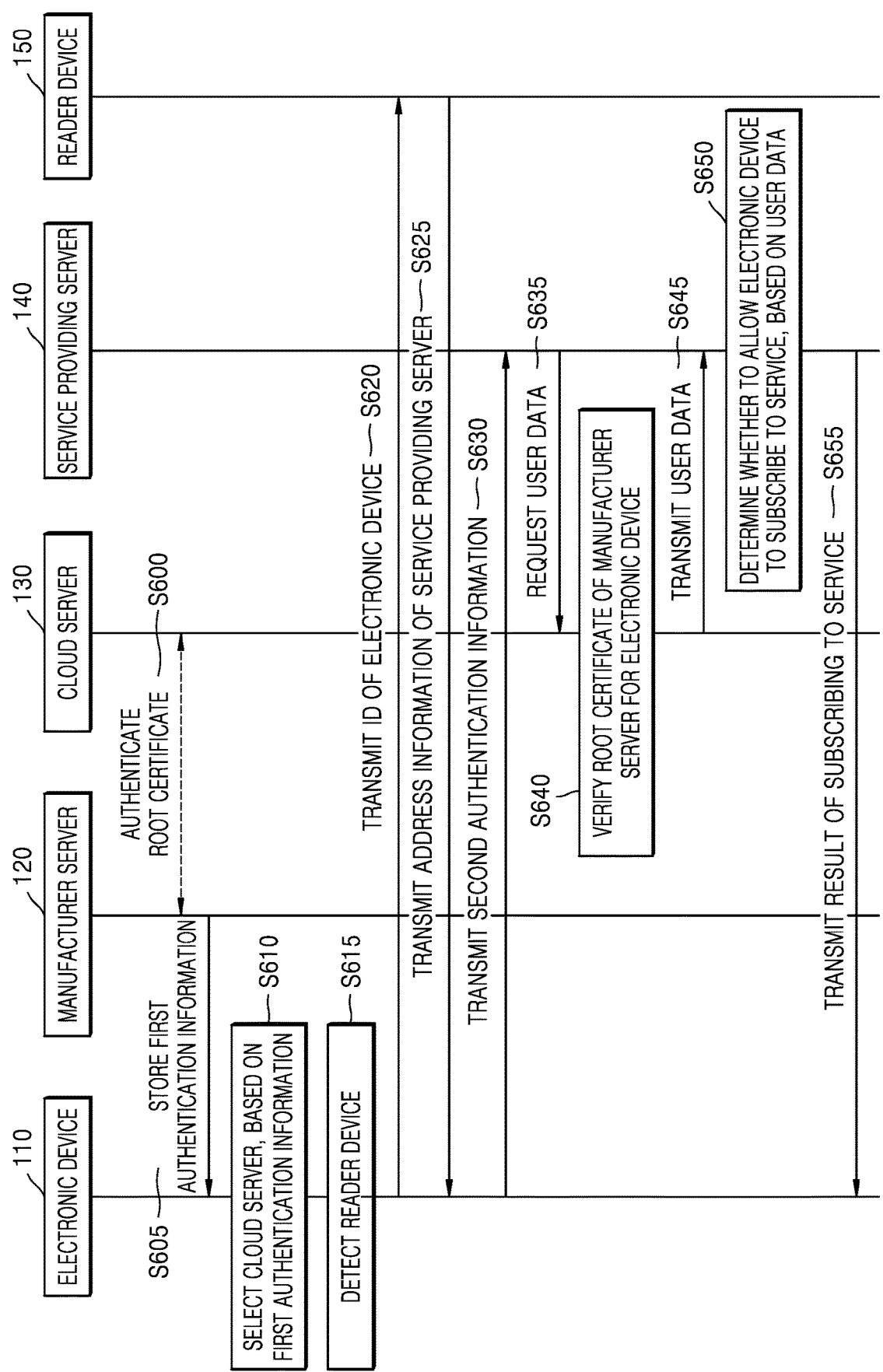
FIG. 6 is a sequence diagram showing entire operation procedures of entities, according to an embodiment of the disclosure.

In operation S530, the cloud server 130 may transmit the stored data to the service providing server 140. For example, the cloud server 130 may use the ID of the electronic device 110 to verify that the electronic device 110 has been authenticated by the manufacturer server 120. Thereafter, the cloud server 130 may transmit, to the service providing server 140, the data related to the user corresponding to the authenticated electronic device 110. According to an embodiment, the data related to the user may include payment information of the user, or information about a name or account of the user. As shown in FIG. 5, the cloud server 130 may receive the information about the ID of the electronic device 110 from the service providing server 140 and verify the root certificate of the manufacturer server 120, based on the received ID of the electronic device 110, thereby authenticating the electronic device 110. FIG. 6 described below illustrates entire processes in which the entities of the disclosure operate.

FIG. 6 is a sequence diagram showing entire operation procedures of entities, according to an embodiment of the disclosure. According to an embodiment, the entities may denote independent or non-independent entities that perform operations according to the disclosure. For example, in FIG. 6, the entities may include the electronic device 110, the manufacturer server 120, the cloud server 130, the service providing server 140, and the reader device 150. However, the disclosure is not limited thereto.

Referring to FIG. 6, in operation S600, the manufacturer server 120 may authenticate the root certificate with the cloud server 130. For example, the root certificate may denote a public key certificate managed by a root CA, or a self-signed certificate. For example, the root CA may be the manufacturer server 120. The manufacturer server 120 may authenticate the root certificate as the root CA, and share information about the root certificate with the cloud server 130.

In operation S605, the manufacturer server 120 may store the first authentication information in the electronic device 110. According to an embodiment, the manufacturer server 120 may sign, with a private key of the manufacturer server 120, a certificate including the ID of the electronic device 110 and network address information of a plurality of cloud servers, and then store the signed private key in the electronic device 110. Also, the manufacturer server 120 may store a private key of the electronic device 110 in the electronic device 110. According to an embodiment, the certificate may be included in the first authentication information.

In operation S610, the electronic device 110 may select the cloud server 130, based on the first authentication information. For example, the electronic device 110 may select the cloud server 130 for storing data among network addresses of the plurality of cloud servers, included in the first authentication information, based on a user input. According to an embodiment, the electronic device 110 may select the pre-determined cloud server 130, regardless of the user input. After the cloud server 130 is selected by the electronic device 110, the user may input data on the electronic device 110. Here, the input data may be stored in the selected cloud server 130. According to an embodiment, an operation of the electronic device 110 selecting the cloud server 130 may be performed during a bootstrap process in which the electronic device 110 is turned on.

In operation S615, the electronic device 110 may detect the reader device 150. For example, when the electronic device 110 is present within the threshold distance from the reader device 150, the electronic device 110 may detect the reader device 150. Although not shown in FIG. 6, the reader device 150 may first detect the electronic device 110. For example, the reader device 150 may receive the signal output from the electronic device 110 present within the threshold distance from the reader device 150, and detect the electronic device 110. When the reader device 150 first detects the electronic device 110, the reader device 150 may transmit, to the electronic device 110, the information indicating that the electronic device 110 is detected.

In operation S620, the electronic device 110 may transmit the ID of the electronic device 110. For example, when the electronic device 110 detects the reader device 150, the electronic device 110 may transmit the ID of the electronic device 110 to the detected reader device 150. When the reader device 150 detects the electronic device 110, the electronic device 110 may receive, from the reader device 150, the information indicating that the electronic device 110 is detected. Upon receiving the information indicating that the electronic device 110 is detected, the electronic device 110 may transmit the ID of the electronic device 110 to the reader device 150 that transmitted the corresponding information.

In operation S625, the reader device 150 may transmit address information of the service providing server 140 to the electronic device 110. Although not shown in FIG. 6, when the electronic device 110 detects the reader device 150 or the reader device 150 detects the electronic device 110, the popup window inquiring whether the user is to use the service may be displayed on the display of the electronic device 110. For example, the popup window may include the first button (e.g., yes) indicating that the user is to use the service, and the second button (e.g., no) indicating that the user is not to use the service. The user may determine whether to use the service, by clicking or touching the first button or second button of the displayed popup window. According to an embodiment, when the user selects to use the service, the reader device 150 may transmit, to the electronic device 110, the network address information of the service providing server 140. However, the transmitting of the network address information of the service providing server 140 is not limited by the selection of the user. For example, the reader device 150 may transmit the network address information of the service providing server 140 to the electronic device 110, based on a pre-set condition, even when the user does not select to use the service.

In operation S630, the electronic device 110 may transmit the second authentication information to the service providing server 140. For example, the second authentication information may include the ID of the electronic device 110, the network address of the selected cloud server 130, and the information about the service executed by the electronic device 110. According to an embodiment, the second authentication information may include the certificate signed with the private key, by the manufacturer server 120. According to an embodiment, the information about the service executed by the electronic device 110 may include authentication information signed by the private key of the electronic device 110. For example, the authentication information signed by the private key of the electronic device 110 may include information indicating service subscription of the user, service ID information for identifying the service, a timestamp, or another service option information.

In operation S635, the service providing server 140 may request the cloud server 130 for user data. For example, the service providing server 140 may receive the second authentication information from the electronic device 110, and transmit, to the cloud server 130, the signal or message requesting the data related to the user of the electronic device 110. According to an embodiment, the signal or message requesting the data related to the user, which is transmitted by the service providing server 140 to the cloud server 130, may include the second authentication information including the ID of the electronic device 110. According to an embodiment, the service providing server 140 may forward the second authentication information received from the electronic device 110 to the cloud server 130, and request the data related to the user.

In operation S640, the cloud server 130 may verify the root certificate of the manufacturer server 120 for the electronic device 110. According to an embodiment, the cloud server 130 may receive, from the service providing server 140, the signal or message requesting the data related to the user. The cloud server 130 may verify the root certificate of the manufacturer server 120, based on the received ID of the electronic device 110. For example, the cloud server 130 may verify whether the received ID of the electronic device 110 is authenticated by the manufacturer server 120.

In operation S645, the cloud server 130 may transmit the user data to the service providing server 140. When the received ID of the electronic device 110 is identified as an ID authenticated by the manufacturer server 120, the cloud server 130 may transmit, to the service providing server 140, the data related to the user of the electronic device 110. For example, the data related to the user may include payment information of the user, user name information, or information about a user account.

In operation S650, the service providing server 140 may determine whether to allow the electronic device 110 to subscribe to the service, based on the user data. The service providing server 140 may receive, from the cloud server 130, the data related to the user. The service providing server 140 may allow the electronic device 110 to subscribe to the service, based on the data related to the user, such that the user of the electronic device 110 may use the service.

In operation S655, the service providing server 140 may transmit, to the electronic device 110, the result of subscribing to the service. The electronic device 110 may receive the information about the result of subscribing to the service from the service providing server 140, and use the subscribed service. For example, the electronic device 110 may unlock a shared bicycle. Also, the electronic device 110 may unlock a door of a room of an accommodation, such as a hotel. The user may use the shared bicycle or room that is unlocked by using the electronic device 110. As shown in FIG. 6, via the operations of the entities of the disclosure, authentication based on the ID of the electronic device 110 may be performed, and the user may use the service based on the authentication. A specific embodiment of using a service, by using authentication of an electronic device will be described.

According to an embodiment of the disclosure, a user may use a bicycle rental service by using authentication of an electronic device. For example, the user may purchase the electronic device. Here, the electronic device may include a certificate including an ID of the electronic device. The user may turn on the electronic device and select a cloud server for storing data of the user. According to an embodiment, the user may select the cloud server managed by a manufacturer of the electronic device. After selecting the cloud server, the user may input the data of the user to the electronic device to transmit the data of the user to the cloud server. For example, the data of the user may include payment information of the user or personal identification number (PIN) information of the user.

The user holding the electronic device may go to a place providing the bicycle rental service so as to rent a bicycle. When the user approaches near the bicycle to be rented, a detection sensor, such as a UWB sensor, attached to the bicycle may detect the electronic device. According to an embodiment, the electronic device may first detect the presence of the bicycle. When the electronic device is detected by the detection sensor of the bicycle or the electronic device detects the bicycle, the electronic device may transmit, to a reader device of the bicycle, the certificate including the ID of the electronic device. Upon receiving the certificate from the electronic device, the reader device may transmit the certificate to a service providing server managing the bicycle rental service. According to an embodiment, when the reader device is not connected to the Internet, UWB pairing may be used between the electronic device and the reader device. For example, the reader device may transmit a network address of the service providing server to the electronic device, by using UWB communication. Upon receiving the network address of the service providing server, the electronic device may transmit the certificate to the service providing server.

Upon receiving the certificate, the service providing server may request the cloud server to transmit necessary data of the user. After verifying a root certificate, the cloud server may transmit the requested data of the user to the service providing server. Upon receiving the data of the user, the service providing server may transmit service subscription information to the electronic device. According to an embodiment, the service providing server may transmit, to the electronic device, information related to a digital key used by the user to use a service, together with the service subscription information. The electronic device may use the bicycle rental service by transmitting the received digital key to the bicycle.

According to an embodiment of the disclosure, a user may use an accommodation by using authentication of an electronic device. For example, the user may purchase the electronic device. The user may generate a user account and register the purchased electronic device in a cloud server managed by a manufacturer of the electronic device. An input message regarding additional data to be safely stored for a service registration purpose may be displayed on the electronic device. For example, the additional data may include passport information of the user of the electronic device. Also, authorization to use a program guaranteed by the manufacturer of the electronic device may be assigned to the electronic device.

Figure 7:
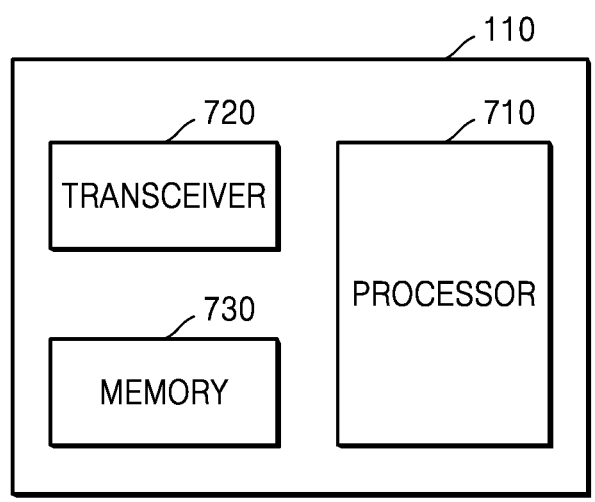
FIG. 7 is a block diagram of an electronic device according to an embodiment of the disclosure.
Figure 8:
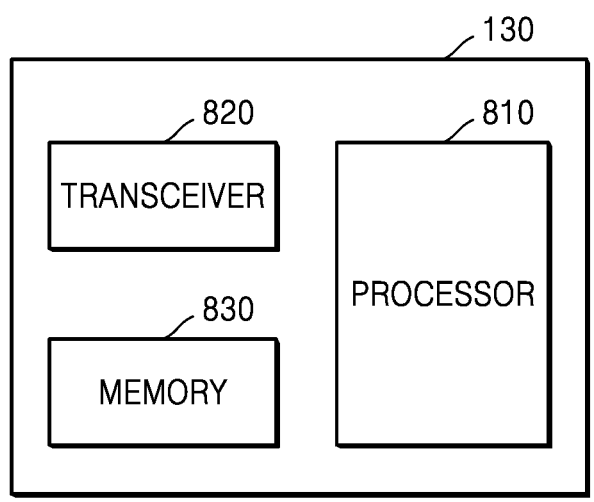
FIG. 8 is a block diagram of a cloud server according to an embodiment of the disclosure.
Figure 9:
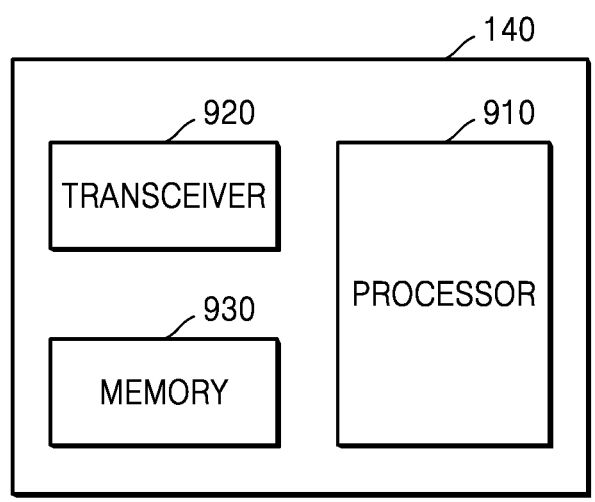
FIG. 9 is a block diagram of a service providing server according to an embodiment of the disclosure.

The user may check into an airport or hotel via online. Here, a service providing server may receive information related to the authorization of the user and collect the additional data in addition to the authorization of the user. Whenever the user uses a service related to the airport or hotel, the user using the electronic device measuring a distance via a UWB ranging technique may transmit a device ID of the electronic device to the cloud server to authenticate a device and user. Data of the authenticated user may be transmitted to a service providing server from the cloud server storing the data. Through the above-described processes, the user may easily use an airport lounge and fast track without a separate interaction. Also, the user may easily check a luggage. For example, additional check-in is not required to keep the luggage, and a tracking barcode for the luggage may be automatically printed. Also, the user may use the authentication using the electronic device to unlock a door or a room and use the room, without having to visit an information desk of the hotel. Also, the user may use the authentication using the electronic device and thus may not need to maintain separate user accounts corresponding to a plurality of services so as to use the services. In addition, when the user is authenticated by an ID of one electronic device, promotion between separate services, such as the hotel and the airport, may be performed together. FIGS. 7 through 9 described below illustrate device diagrams showing configurations of entities of the disclosure.

FIG. 7 is a block diagram of an electronic device according to an embodiment of the disclosure.

Referring to FIG. 7, the electronic device 110 may include a processor 710, a transceiver 720, and a memory 730. However, the components shown in FIG. 7 are not all essential components of the electronic device 110. The electronic device 110 may be implemented by more or fewer components than those shown in FIG. 7.

According to an embodiment, the transceiver 720 may communicate with the manufacturer server 120, cloud server 130, service providing server 140, reader device 150, or another electronic device, which is connected to the electronic device 110 wirelessly or via wires. For example, the transceiver 720 may communicate with another electronic device by using Bluetooth, Bluetooth low energy (BLE), near field communication, wireless local area network (WLAN), Wi-Fi, Zigbee, infrared data association (IrDA) communication, Wi-Fi direction (WFD) communication, or ultra wideband (UWB) communication.

A program such as an application and various types of data such as a file may be installed and stored in the memory 730. The processor 710 may access and use the data stored in the memory 730 or may store new data in the memory 730.

The processor 710 may control all operations of the electronic device 110 and include at least one processor, such as a central processing unit (CPU) or a graphics processing unit (GPU). The processor 710 may control other components included in the electronic device 110 to perform an operation for operating the electronic device 110. For example, the processor 710 may execute a program stored in the memory 730, read a file stored in the memory 730, or store a new file in the memory 730.

According to an embodiment, the processor 710 may execute a program stored in the memory 730 to perform an operation for operating the electronic device 110. For example, the processor 710 may select a cloud server for storing data, based on first authentication information including an ID of the electronic device 110 and network addresses of a plurality of cloud servers. The processor 710 may transmit, to the service providing server 140, second authentication information including the ID of the electronic device 110, a network address of the selected cloud server 130, and information about a service executed by the electronic device 110. The processor 710 may receive, from the service providing server 140, information about a result of subscribing to a service determined based on the second authentication information.

According to an embodiment, the first authentication information may be pre-generated by the manufacturer server 120 of the electronic device 110, and the pre-generated first authentication information may be stored in the electronic device 110.

According to an embodiment, the ID of the electronic device 110 may be used to access, by the service providing server 140, data stored in the cloud server 130.

According to an embodiment, the data stored in the cloud server 130 may include information about a user of the electronic device 110, and the information about the user may include payment information of the user or user account information.

According to an embodiment, the processor 710 may detect the reader device 150 related to the service executed by the electronic device 110, transmit the ID of the electronic device 110 to the detected reader device 150, and receive network address information of the service providing server 140, based on authentication using the ID of the electronic device 110.

According to an embodiment, the information about the service executed by the electronic device 110 may include service subscription information of the electronic device 110, a service ID, or the network address information of the service providing server 140.

FIG. 8 is a block diagram of a cloud server according to an embodiment of the disclosure.

Referring to FIG. 8, the cloud server 130 may include a processor 810, a transceiver 820, and a memory 830. However, the components shown in FIG. 8 are not all essential components of the cloud server 130. The cloud server 130 may be implemented by more or fewer components than those shown in FIG. 8.

According to an embodiment, the transceiver 820 may communicate with the electronic device 110, manufacturer server 120, service providing server 140, or another electronic device, which is connected to the cloud server 130 wirelessly or via wires.

A program such as an application and various types of data such as a file may be installed and stored in the memory 830. The processor 810 may access and use the data stored in the memory 830 or may store new data in the memory 830.

The processor 810 may control all operations of the cloud server 130 and include at least one processor, such as a central processing unit (CPU) or a graphics processing unit (GPU). The processor 810 may control other components included in the cloud server 130 to perform an operation for operating the cloud server 130. For example, the processor 810 may execute a program stored in the memory 830, read a file stored in the memory 830, or store a new file in the memory 830.

According to an embodiment, the processor 810 may execute a program stored in the memory 830 to perform an operation for operating the cloud server 130. For example, the processor 810 may receive an ID of the electronic device 110 from the service providing server 140, verify a root certificate of the manufacturer server 120 of the electronic device 110, based on the received ID of the electronic device 110, and transmit, to the service providing server 140, data stored in the cloud server 130, based on the verification of the root certificate.

According to an embodiment, the cloud server 130 may be selected by the manufacturer server 120, based on pre-generated first authentication information, and the first authentication information may include the ID of the electronic device 110 and network addresses of a plurality of cloud servers.

According to an embodiment, the data stored in the cloud server 130 may be used by the service providing server 140 for the electronic device 110 to subscribed to a service.

According to an embodiment, the data stored in the cloud server 130 may include information about a user of the electronic device 110, and the information about the user may include payment information of the user or user account information.

FIG. 9 is a block diagram of a service providing server according to an embodiment of the disclosure.

Referring to FIG. 9, the service providing server 140 may include a processor 910, a transceiver 920, and a memory 930. However, the components shown in FIG. 9 are not all essential components of the service providing server 140. The service providing server 140 may be implemented by more or fewer components than those shown in FIG. 9.

According to an embodiment, the transceiver 920 may communicate with the electronic device 110, cloud server 130, or another electronic device, which is connected to the service providing server 140 wirelessly or via wires.

A program such as an application and various types of data such as a file may be installed and stored in the memory 930. The processor 910 may access and use the data stored in the memory 930 or may store new data in the memory 930. The processor 910 may control all operations of the service providing server 140 and include at least one processor, such as a central processing unit (CPU) or a graphics processing unit (GPU). The processor 910 may control other components included in the service providing server 140 to perform an operation for operating the service providing server 140. For example, the processor 910 may execute a program stored in the memory 930, read a file stored in the memory 930, or store a new file in the memory 930.

According to an embodiment, the processor 910 may execute a program stored in the memory 930 to perform an operation for operating the service providing server 140. For example, the processor 910 may receive second authentication information from the electronic device 110, access the cloud server 130 based on the received second authentication information, and receive stored data from the cloud server 130.

An embodiment of the disclosure may also be realized in a form of a recording medium including instructions executable by a computer, such as a program module executed by a computer. A computer-readable medium may be an arbitrary available medium accessible by a computer, and includes all volatile and non-volatile media and separable and non-separable media. Further, the computer-readable medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium may typically include other data of a modulated data signal, such as a computer-readable instruction, a data structure, or a program module.

A machine-readable storage medium may be provided in a form of a non-transitory storage medium. Here, the 'non-transitory storage medium' only denotes a tangible device and does not contain a signal (for example, electromagnetic waves). This term does not distinguish a case where data is stored in the storage medium semi-permanently and a case where the data is stored in the storage medium temporarily. For example, the 'non-transitory storage medium' may include a buffer where data is temporarily stored.

According to an embodiment, a method according to various embodiments disclosed in the present specification may be provided by being included in a computer program product. The computer program products are products that can be traded between sellers and buyers. The computer program product may be distributed in a form of machine-readable storage medium (for example, a compact disc read-only memory (CD-ROM)), or distributed (for example, downloaded or uploaded) through an application store (for example, Play Store™) or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

Also, in the disclosure, the term "unit" or "module" may be a hardware component such as a processor or circuit and/or a software component that is executed by a hardware component such as a processor.

The "unit" or "module" is stored in an addressable storage medium and may be implemented by a program executable by a processor. For example, the "unit" or "module" may be implemented by components, such as software components, object-oriented software components, class components, and task components, processes, functions, attributes, procedures, subroutines, segments of program code, drivers, firmware, micro codes, circuits, data, a database, data structures, tables, arrays, and variables.

Certain executions described in the disclosure are only an embodiment and do not limit the scope of the disclosure in any way. For brevity of the specification, general electronic configurations, control systems, software, and other functional aspects of systems may be omitted.

Also, in the disclosure, the expression "including at least one of a, b, or c" may denote including only a, including only b, including only c, including a and b, including b and c, including a and c, and including all of a, b, and c.

The above description of the disclosure is provided for illustration, and it will be understood by one of ordinary skill in the art that various changes in form and details may be readily made therein without departing from essential features and the scope of the disclosure as defined by the following claims. Accordingly, the embodiments described above are examples in all aspects and are not limited. For example, each component described as a single type may be implemented in a distributed manner, and similarly, components described as distributed may be implemented in a combined form.

The scope of the disclosure is defined by the appended claims rather than the detailed description, and all changes or modifications within the scope of the appended claims and their equivalents will be construed as being included in the scope of the disclosure.

The invention claimed is:

1. An operation method performed by a cloud server, the operation method comprising:
receiving, from a service providing server, a request message for user data, wherein the request message includes an identifier of an electronic device;
based on the received identifier of the electronic device and a root certificate of a manufacturer server of the electronic device, verifying whether the received identifier of the electronic device is an identifier authenticated by the manufacturer server; and
based on the verification that the received identifier of the electronic device is an identifier authenticated by the manufacturer server, transmitting, to the service providing server, user data stored in the cloud server.

2. The operation method of claim 1,
wherein the cloud server is selected based on first authentication information pre-generated by the manufacturer server, and
wherein the first authentication information comprises the identifier of the electronic device and network addresses of a plurality of cloud servers.

3. The operation method of claim 1, wherein the user data stored in the cloud server is used by the service providing server for subscribing the electronic device to a service.

4. The operation method of claim 1,
wherein the user data stored in the cloud server comprises information about a user of the electronic device, and
wherein the information about the user comprises payment information of the user or account information of the user.

5. The operation method of claim 1, wherein the root certificate is authenticated by the manufacturer server of the electronic device and shared with the cloud server.

6. A cloud server comprising:
memory storing one or more instructions; and
at least one processor communicatively coupled to the memory,
wherein the one or more instructions, when executed by the at least one processor individually or collectively, cause the cloud server to:
receive, from a service providing server, a request message for user data, wherein the request message includes an identifier of an electronic device;
based on the received identifier of the electronic device and a root certificate of a manufacturer server of the electronic device, verify whether the received identifier of the electronic device is an identifier authenticated by the manufacturer server; and
based on the verification that the received identifier of the electronic device is an identifier authenticated by the manufacturer server, transmit, to the service providing server, user data stored in the cloud server.

7. The cloud server of claim 6,
wherein the cloud server is selected based on first authentication information pre-generated by the manufacturer server, and
wherein the first authentication information comprises the identifier of the electronic device and network addresses of a plurality of cloud servers.

8. The cloud server of claim 6, wherein the user data stored in the cloud server is used by the service providing server for subscribing the electronic device to a service.

9. The cloud server of claim 6,
wherein the user data stored in the cloud server comprises information about a user of the electronic device, and
wherein the information about the user comprises payment information of the user or account information of the user.

10. The cloud server of claim 6, wherein the root certificate is authenticated by the manufacturer server of the electronic device and shared with the cloud server.

* * * * *